(12) United States Patent     (10) Patent No.: US 12,314,942 B2
Driggs et al.     (45) Date of Patent: May 27, 2025

(54) SYSTEMS AND METHODS FOR FUND TRANSFERS

(71) Applicant: Green Dot Corporation, Cincinnati, OH (US)

(72) Inventors: Gary Taylor Driggs, Oak Park, CA (US); David Gullett, Moorpark, CA (US); Helena Mao, Pasadena, CA (US); Calvin Park, Pasadena, CA (US); Vijay Ramamurthy, Pasadena, CA (US); Jeffrey Wang, Pasadena, CA (US)

(73) Assignee: Green Dot Corporation, Cincinnati, OH (US)

( * ) Notice: Subject to any disclaimer, the term of this patent is extended or adjusted under 35 U.S.C. 154(b) by 128 days.

(21) Appl. No.: 17/646,862

(22) Filed: Jan. 3, 2022

(65) Prior Publication Data

US 2022/0207522 A1     Jun. 30, 2022

Related U.S. Application Data

(63) Continuation of application No. 16/588,797, filed on Sep. 30, 2019, now Pat. No. 11,216,810, which is a
(Continued)

(51) Int. Cl.
*G06Q 20/00*     (2012.01)
*G06Q 20/10*     (2012.01)
(Continued)

(52) U.S. Cl.
CPC .......... *G06Q 20/385* (2013.01); *G06Q 20/10* (2013.01); *G06Q 20/204* (2013.01); *G06Q 20/223* (2013.01)

(58) Field of Classification Search
CPC .............................. G06Q 20/385; G06Q 20/20
(Continued)

(56) References Cited

U.S. PATENT DOCUMENTS 4,804,984 A     2/1989    Heuer et al.
4,939,662 A     7/1990    Nimura et al.
(Continued)

FOREIGN PATENT DOCUMENTS

EP     1209874 B1     9/2007
EP     1295500 B1     5/2009
(Continued)

OTHER PUBLICATIONS

International Search Report and Written Opinion for International Application No. PCT/IB2008/02235, Search Completed Apr. 23, 2009, Mailed May 28, 2009.
(Continued)

*Primary Examiner* — Rokib Masud
(74) *Attorney, Agent, or Firm* — KPPB LLP

(57) ABSTRACT

Turning now to the drawings, systems and methods for transferring funds in accordance with embodiments of the invention are illustrated. In one embodiment, a method for conducting peer-to-peer transfers includes obtaining a cash-out request data using a fund transfer server system, wherein the cash-out request data includes target account data and fund data, the target account data includes metadata identifying a consumer account and specifies an account to which funds will be provided, and the fund data describes the funds to be provided in response to redeeming the cash-out request, generating a cash-out code based on cash-out request data using the fund transfer server system, providing the cash-out code using the fund transfer server system, obtaining cash-out code redemption data using the fund transfer server system, wherein the cash-out code redemp-
(Continued)

tion data identifies the provided cash-out code, and transmitting a request to provide the funds described by the fund data.

20 Claims, 7 Drawing Sheets

Related U.S. Application Data continuation of application No. 14/820,333, filed on Aug. 6, 2015, now Pat. No. 10,430,788.

(51) Int. Cl.
  *G06Q 20/20* (2012.01)
  *G06Q 20/22* (2012.01)
  *G06Q 20/38* (2012.01)
(58) Field of Classification Search
  USPC .......................................................... 705/17
  See application file for complete search history.

(56) References Cited

U.S. PATENT DOCUMENTS

| | | |
|---|---|---|
| 5,086,394 A | 2/1992 | Shapira |
| 5,320,409 A | 6/1994 | Katoh et al. |
| 5,740,915 A | 4/1998 | Williams |
| 5,754,939 A | 5/1998 | Herz et al. |
| 5,758,313 A | 5/1998 | Shah et al. |
| 5,760,381 A | 6/1998 | Stich et al. |
| 5,777,305 A | 7/1998 | Smith et al. |
| 5,842,629 A | 12/1998 | Sprague et al. |
| 5,918,909 A | 7/1999 | Fiala et al. |
| 5,975,302 A | 11/1999 | Young |
| 5,984,091 A | 11/1999 | Orr et al. |
| 6,014,090 A | 1/2000 | Rosen et al. |
| 6,049,711 A | 4/2000 | Ben-Yehezkel et al. |
| 6,052,122 A | 4/2000 | Sutcliffe et al. |
| 6,061,681 A | 5/2000 | Collins et al. |
| 6,109,439 A | 8/2000 | Goade, Sr. |
| 6,112,186 A | 8/2000 | Bergh et al. |
| 6,185,545 B1 | 2/2001 | Resnick et al. |
| 6,208,934 B1 | 3/2001 | Bechtolsheim et al. |
| 6,224,108 B1 | 5/2001 | Klure |
| 6,272,467 B1 | 8/2001 | Durand et al. |
| 6,315,206 B1 | 11/2001 | Hansen et al. |
| 6,317,718 B1 | 11/2001 | Fano |
| 6,349,829 B1 | 2/2002 | Matheis et al. |
| 6,366,568 B1 | 4/2002 | Bolgiano et al. |
| 6,456,854 B1 | 9/2002 | Chern et al. |
| 6,457,649 B1 | 10/2002 | Hileman |
| 6,529,136 B2 | 3/2003 | Cao et al. |
| 6,529,143 B2 | 3/2003 | Mikkola et al. |
| 6,539,232 B2 | 3/2003 | Hendrey |
| 6,549,768 B1 | 4/2003 | Fraccaroli |
| 6,618,593 B1 | 9/2003 | Drutman et al. |
| 6,639,905 B1 | 10/2003 | Müller et al. |
| 6,687,608 B2 | 2/2004 | Sugimoto et al. |
| 6,732,459 B1 | 5/2004 | Clark |
| 6,819,919 B1 | 11/2004 | Tanaka |
| 6,925,441 B1 | 8/2005 | Jones, III et al. |
| 6,957,737 B1 | 10/2005 | Frederickson et al. |
| 6,965,868 B1 | 11/2005 | Bednarek |
| D512,456 S | 12/2005 | Diaz |
| 7,039,423 B2 | 5/2006 | Daniel et al. |
| 7,047,030 B2 | 5/2006 | Forsyth |
| 7,071,842 B1 | 7/2006 | Brady, Jr. |
| 7,082,365 B2 | 7/2006 | Sheha et al. |
| 7,111,323 B1 | 9/2006 | Bhatia et al. |
| D532,452 S | 11/2006 | Heng |
| 7,139,731 B1 | 11/2006 | Alvin |
| 7,203,502 B2 | 4/2007 | Wilson et al. |
| 7,203,674 B2 | 4/2007 | Cohen |
| 7,236,799 B2 | 6/2007 | Wilson et al. |
| 7,256,711 B2 | 8/2007 | Sheha et al. |
| 7,271,742 B2 | 9/2007 | Sheha et al. |
| 7,333,820 B2 | 2/2008 | Sheha et al. |
| 7,363,027 B2 | 4/2008 | Hon et al. |
| 7,392,935 B2 | 7/2008 | Byrne |
| 7,486,958 B2 | 2/2009 | Sheha et al. |
| 7,494,056 B2 | 2/2009 | Sturm |
| 7,565,155 B2 | 7/2009 | Sheha et al. |
| 7,593,740 B2 | 9/2009 | Crowley et al. |
| 7,634,354 B2 | 12/2009 | Salmre |
| 7,813,741 B2 | 10/2010 | Hendrey et al. |
| 7,840,224 B2 | 11/2010 | Vengroff et al. |
| 7,877,082 B2 | 1/2011 | Eagle et al. |
| 7,917,154 B2 | 3/2011 | Fortescue et al. |
| 7,978,900 B2 | 7/2011 | Nepomniachtchi et al. |
| 8,000,726 B2 | 8/2011 | Altman et al. |
| 8,023,963 B2 | 9/2011 | Yonker et al. |
| 8,086,530 B2 | 12/2011 | Resnick et al. |
| 8,099,109 B2 | 1/2012 | Altman et al. |
| 8,181,789 B1 | 5/2012 | Kohler et al. |
| 8,234,214 B2 | 7/2012 | Templeton et al. |
| 8,275,699 B2 | 9/2012 | Shader et al. |
| 8,352,367 B2 | 1/2013 | Templeton et al. |
| 8,401,904 B1 | 3/2013 | Simakov et al. |
| 8,427,942 B2 | 4/2013 | Kim et al. |
| 8,660,943 B1 | 2/2014 | Chirehdast |
| 8,768,838 B1 | 7/2014 | Hoffman |
| 8,875,990 B2 | 11/2014 | Bishop et al. |
| 8,977,568 B1 * | 3/2015 | Schattauer ........... G06Q 20/383 |
| | | 713/168 |
| 8,989,778 B2 | 3/2015 | Pernikoff et al. |
| 9,710,804 B2 | 7/2017 | Zhou et al. |
| 9,947,004 B2 | 4/2018 | Shankar et al. |
| 10,430,788 B2 | 10/2019 | Driggs et al. |
| 11,216,810 B2 | 1/2022 | Driggs et al. |
| 11,715,154 B2 | 8/2023 | Archer et al. |
| 2001/0001321 A1 | 5/2001 | Resnick et al. |
| 2002/0052786 A1 | 5/2002 | Kim et al. |
| 2002/0077745 A1 | 6/2002 | Ohmura et al. |
| 2003/0016804 A1 | 1/2003 | Sheha et al. |
| 2003/0036848 A1 | 2/2003 | Sheha et al. |
| 2003/0055983 A1 | 3/2003 | Callegari |
| 2003/0060214 A1 | 3/2003 | Hendrey et al. |
| 2003/0061211 A1 | 3/2003 | Shultz et al. |
| 2003/0064705 A1 | 4/2003 | Desiderio |
| 2003/0078035 A1 | 4/2003 | Sheha et al. |
| 2003/0149527 A1 | 8/2003 | Sikila |
| 2003/0150762 A1 | 8/2003 | Biller |
| 2004/0030647 A1 | 2/2004 | Hansen |
| 2004/0054428 A1 | 3/2004 | Sheha et al. |
| 2004/0224703 A1 | 11/2004 | Takaki et al. |
| 2005/0021560 A1 | 1/2005 | Yoon et al. |
| 2005/0027543 A1 | 2/2005 | Labrou et al. |
| 2005/0032527 A1 | 2/2005 | Sheha et al. |
| 2005/0043060 A1 | 2/2005 | Brandenberg et al. |
| 2005/0044409 A1 | 2/2005 | Betz et al. |
| 2005/0054352 A1 | 3/2005 | Karaizman |
| 2005/0073443 A1 | 4/2005 | Sheha et al. |
| 2005/0075119 A1 | 4/2005 | Sheha et al. |
| 2005/0101300 A1 | 5/2005 | Hon et al. |
| 2005/0114527 A1 | 5/2005 | Hankey |
| 2005/0159996 A1 | 7/2005 | Lazarus |
| 2005/0166058 A1 | 7/2005 | Brokenshire et al. |
| 2005/0171898 A1 | 8/2005 | Bishop et al. |
| 2005/0197954 A1 | 9/2005 | Maitland et al. |
| 2005/0216337 A1 | 9/2005 | Roberts et al. |
| 2005/0250552 A1 | 11/2005 | Eagle |
| 2005/0268254 A1 | 12/2005 | Abramson et al. |
| 2005/0283620 A1 | 12/2005 | Khulusi et al. |
| 2005/0289340 A1 | 12/2005 | Camenisch |
| 2006/0027663 A1 | 2/2006 | Tang |
| 2006/0036364 A1 | 2/2006 | Matsuo et al. |
| 2006/0047825 A1 | 3/2006 | Steenstra et al. |
| 2006/0064346 A1 | 3/2006 | Steenstra et al. |
| 2006/0085443 A1 | 4/2006 | Pae |
| 2006/0089160 A1 | 4/2006 | Othmer |
| 2006/0186011 A1 | 8/2006 | Palmer |
| 2006/0223518 A1 | 10/2006 | Haney |
| 2006/0255154 A1 | 11/2006 | Newbrough et al. |

(56) References Cited

U.S. PATENT DOCUMENTS

| | | |
|---|---|---|
| 2006/0270419 A1 | 11/2006 | Crowley et al. |
| 2006/0278551 A1 | 12/2006 | Bianchini et al. |
| 2007/0050129 A1 | 3/2007 | Salmre |
| 2007/0112614 A1 | 5/2007 | Maga et al. |
| 2007/0150414 A1 | 6/2007 | Templeton et al. |
| 2007/0252009 A1 | 11/2007 | Kingsborough et al. |
| 2007/0253712 A1 | 11/2007 | Katagiri et al. |
| 2007/0278293 A1 | 12/2007 | Anderson et al. |
| 2007/0281689 A1 | 12/2007 | Altman et al. |
| 2007/0281690 A1 | 12/2007 | Altman et al. |
| 2008/0022382 A1 | 1/2008 | Bradbury et al. |
| 2008/0052182 A1 | 2/2008 | Marshall et al. |
| 2008/0082424 A1 | 4/2008 | Walton |
| 2008/0086414 A1 | 4/2008 | Ching |
| 2008/0091535 A1 | 4/2008 | Heiser |
| 2008/0103959 A1 | 5/2008 | Carroll et al. |
| 2008/0109358 A1 | 5/2008 | Kottmeier et al. |
| 2008/0132252 A1 | 6/2008 | Altman et al. |
| 2008/0133322 A1 | 6/2008 | Kalia et al. |
| 2008/0133336 A1 | 6/2008 | Altman et al. |
| 2008/0188246 A1 | 8/2008 | Sheha et al. |
| 2008/0195536 A1 | 8/2008 | Karns et al. |
| 2008/0208697 A1 | 8/2008 | Kargman |
| 2008/0227473 A1 | 9/2008 | Haney |
| 2008/0237317 A1 | 10/2008 | Rosendall |
| 2008/0270802 A1 | 10/2008 | Ashley |
| 2009/0063286 A1 | 3/2009 | Rodriguez Porras |
| 2009/0081989 A1 | 3/2009 | Wuhrer |
| 2009/0090783 A1 | 4/2009 | Killian et al. |
| 2009/0164366 A1 | 6/2009 | Blythe et al. |
| 2009/0177375 A1 | 7/2009 | Jung et al. |
| 2009/0254413 A1 | 10/2009 | Chang |
| 2009/0298481 A1 | 12/2009 | Hurst |
| 2010/0036770 A1 | 2/2010 | Fourez et al. |
| 2010/0106568 A1 | 4/2010 | Grimes |
| 2010/0106569 A1 | 4/2010 | Grimes |
| 2010/0106577 A1 | 4/2010 | Grimes |
| 2010/0106596 A1 | 4/2010 | Grimes |
| 2010/0106598 A1 | 4/2010 | Grimes |
| 2010/0211499 A1 | 8/2010 | Zanzot et al. |
| 2010/0240352 A1 | 9/2010 | Suri et al. |
| 2010/0306089 A1 | 12/2010 | Gelerman et al. |
| 2010/0318489 A1 | 12/2010 | De Barros et al. |
| 2011/0016048 A1 | 1/2011 | Lindqvist et al. |
| 2011/0029434 A1 | 2/2011 | Templeton et al. |
| 2011/0035284 A1 | 2/2011 | Moshfeghi |
| 2011/0047619 A1 | 2/2011 | King et al. |
| 2011/0051665 A1 | 3/2011 | Huang |
| 2011/0099082 A1 | 4/2011 | Walker et al. |
| 2011/0184840 A1* | 7/2011 | Godard ................ G06Q 30/06 705/30 |
| 2011/0208550 A1 | 8/2011 | Lamarche et al. |
| 2011/0208612 A1 | 8/2011 | Shader et al. |
| 2011/0208641 A1 | 8/2011 | Shader et al. |
| 2011/0208642 A1 | 8/2011 | Shader et al. |
| 2011/0208643 A1 | 8/2011 | Shader et al. |
| 2011/0208649 A1 | 8/2011 | Shader et al. |
| 2011/0225063 A1 | 9/2011 | Grunski et al. |
| 2011/0251892 A1* | 10/2011 | Laracey ................ G06Q 20/20 705/16 |
| 2011/0258122 A1 | 10/2011 | Shader |
| 2011/0270661 A1 | 11/2011 | Heiser, II et al. |
| 2011/0270756 A1* | 11/2011 | Tullis ................ G06Q 20/10 705/44 |
| 2011/0275388 A1 | 11/2011 | Haney |
| 2011/0276374 A1 | 11/2011 | Heiser, II et al. |
| 2011/0276474 A1 | 11/2011 | Portillo |
| 2011/0313926 A1 | 12/2011 | Templeton et al. |
| 2012/0005085 A1 | 1/2012 | Pitroda |
| 2012/0022971 A1 | 1/2012 | Morris |
| 2012/0066081 A1 | 3/2012 | Shader |
| 2012/0095909 A1 | 4/2012 | Resnick et al. |
| 2012/0136789 A1 | 5/2012 | Kendrick et al. |
| 2012/0136790 A1 | 5/2012 | Templeton et al. |
| 2012/0150605 A1 | 6/2012 | Isaacson et al. |
| 2012/0233069 A1* | 9/2012 | Bulawa ................ G06Q 20/40 705/40 |
| 2012/0246019 A1 | 9/2012 | Wolfe |
| 2012/0292206 A1 | 11/2012 | Casella et al. |
| 2012/0296813 A1 | 11/2012 | Templeton et al. |
| 2012/0296814 A1 | 11/2012 | Templeton et al. |
| 2012/0310833 A1 | 12/2012 | Templeton et al. |
| 2013/0006785 A1 | 1/2013 | Perkins |
| 2013/0036034 A1 | 2/2013 | Karon et al. |
| 2013/0041729 A1 | 2/2013 | Shader |
| 2013/0041741 A1 | 2/2013 | Shader |
| 2013/0073403 A1 | 3/2013 | Tuchman et al. |
| 2013/0144734 A1 | 6/2013 | Perkins |
| 2013/0144789 A1 | 6/2013 | Aaltonen et al. |
| 2013/0204925 A1 | 8/2013 | McDougall et al. |
| 2013/0291127 A1 | 10/2013 | Bergman et al. |
| 2013/0317923 A1 | 11/2013 | Capps |
| 2014/0006191 A1 | 1/2014 | Shankar et al. |
| 2014/0012648 A1 | 1/2014 | Grimes |
| 2014/0012690 A1 | 1/2014 | Capps |
| 2014/0019322 A1 | 1/2014 | Streit et al. |
| 2014/0058837 A1 | 2/2014 | Grimes |
| 2014/0115710 A1 | 4/2014 | Hughes |
| 2014/0122684 A1 | 5/2014 | Brentano |
| 2014/0180819 A1 | 6/2014 | Grimes |
| 2014/0316988 A1* | 10/2014 | Nosek .................... G06Q 40/03 705/44 |
| 2014/0351072 A1 | 11/2014 | Wieler et al. |
| 2015/0081565 A1 | 3/2015 | Roullier et al. |
| 2015/0101062 A1 | 4/2015 | Silver et al. |
| 2015/0142655 A1 | 5/2015 | Ghosh et al. |
| 2015/0180736 A1 | 6/2015 | Leung |
| 2015/0193873 A1 | 7/2015 | Hammock et al. |
| 2015/0199725 A1 | 7/2015 | Aaltonen et al. |
| 2015/0206137 A1 | 7/2015 | Mazarim et al. |
| 2016/0071083 A1 | 3/2016 | Apps |
| 2016/0189213 A1 | 6/2016 | Gopalan et al. |
| 2016/0189229 A1 | 6/2016 | Gopalan et al. |
| 2016/0189230 A1 | 6/2016 | Gopalan et al. |
| 2016/0189292 A1 | 6/2016 | Deshpande et al. |
| 2016/0342967 A1 | 11/2016 | Proctor et al. |
| 2016/0379211 A1 | 12/2016 | Hoyos et al. |
| 2017/0024731 A1 | 1/2017 | Gullett et al. |
| 2017/0039551 A1 | 2/2017 | Driggs et al. |
| 2017/0053276 A1 | 2/2017 | Gullett et al. |
| 2017/0097996 A1 | 4/2017 | Gullett et al. |
| 2018/0268396 A1 | 9/2018 | Shankar et al. |
| 2018/0308157 A1 | 10/2018 | Streit et al. |
| 2018/0315028 A1 | 11/2018 | Gullett et al. |
| 2019/0095989 A1 | 3/2019 | Archer et al. |
| 2020/0097957 A1 | 3/2020 | Driggs et al. |

FOREIGN PATENT DOCUMENTS

| | | | |
|---|---|---|---|
| WO | 2001060100 | | 8/2001 |
| WO | 2006004794 A2 | | 1/2006 |
| WO | WO-2014089225 A1 * | 6/2014 | ........... G06Q 20/042 |

OTHER PUBLICATIONS

International Search Report and Written Opinion for International Application No. PCT/US2007/012960, Search Completed Dec. 13, 2007, Mailed Jan. 3, 2008.

International Search Report and Written Opinion for International Application No. PCT/US2009/049956, Search Completed Aug. 24, 2009, Mailed Sep. 1, 2009.

"Method for Avoiding and Repairing Damage to Distributed Transactions in A Coordinated Resource Recovery System," IBM Technical Disclosure Bulletin, 1991, vol. 33, Issue 10A, pp. 362-366.

Altman, "Viendo: A Mobile Entertainment Management Service," BASES Business Plan Compeition/Symposium, Apr. 9, 2005.

Bahl et al., "RADAR: An In-Building RF-based User Location and Tracking System," Proceedings of IEEE INFOCOM 2000, vol. 2, Tel-Aviv, Israel, Mar. 2000, pp. 775-784.

Chintalapudi, "Indoor Localization Without the Pain, in Mobicom,," Association for Computing Machinery, Inc., Sep. 2010.

(56) References Cited

OTHER PUBLICATIONS

Eriksson et al., "Cabernet: Vehicular Content Delivery Using WiFi.," MIT CSAIL Mobicom '08.
Fiercewireless, "Sprint offers Loopt's social mapping service," Published online Jul. 17, 2007, retrieved from Internet at http://fiercewireless.com/story/sprint-offers-loopts-social-mapping-service/7/17/07 on Mar. 8, 2009.
Jama, Non-Final Office Action for U.S. Appl. No. 11/445,727, mailed Jul. 25, 2008.
Jama, Non-Final Office Action for U.S. Appl. No. 11/445,729, mailed Jun. 9, 2008.
Jama, Non-Final Office Action for U.S. Appl. No. 11/445,751, mailed Jul. 10, 2008.
Ji et al., "ARIADNE: A Dynamic Indoor Signal Map Construction and Localization System," In MobiSys, 2006.
Karouia et al., "Video Similarity Measurement Based on Attributed Relational Graph Matching," N.T. Nguyen, R. Katarzyniak (Eds.): New Challenges in Applied Intelligence Technologies, SCI 134, pp. 173-182, 2008, 2008, 10 Pages.
LAT49, Screen capture of http://lat49.com/howitworks/index.php, Jun. 12, 2009.
Liu, "BASES business competition awards $2,000," The Daily Stanford Online Edition, Apr. 11, 2005, Retrieved from Internet at http://www.stanforddaily.com/cgi-bin/?p=1017453 on Oct. 26, 2009.
Loopt, "About Loopt," Internet Article, Dec. 14, 2004, Retrieved from Internet at http://www.loopt.com/ about on Mar. 8, 2009.

Madigan et al., "Bayesian Indoor Positioning Systems," In Infocom, 2005.
Duckham et al., "Location Privacy and Location-aware computing," 2005.
Mobilaris, "Find Your Buddy is a Social Networking application," Jun. 7, 2007 Retrieved from Internet at http://mobilaris.gotlandica.se/virtupload/contenU27/Find_Y our_Buddy.pdf on Mar. 8, 2009.
Mobilaris, "Pacific Ocean extends technology lead by integrating MapInfo miAware?, LBS Platform" Feb. 6, 2003, Retrieved from Internet at http://nweb.waymaker.se/ bitonline/2003/02/06/20030205BIT00440/wkr0002.pdf on Mar. 8, 2009.
Nguyen, Non-Final Office Action for U.S. Appl. No. 11/445,730, mailed Apr. 29, 2009.
Nguyen, Non-Final Office Action for U.S. Appl. No. 11/881,836, mailed Jul. 23, 2009.
Schreiner, "Where We At? Mobile Phones Bring GPS to the Masses," IEEE Computer Graphics and Applications, vol. 27, No. 3, May 2007-Jun. 2007, pp. 6-11.
secretadmirer.com, Screen capture using http://web.archive.org of http://secretAdmirer.com website, Dec. 2, 1998.
Youssef et al., "The Horus WLAN Location Determination System," In MobiSys, 2005.
Anonymous, "WorldPay Launches Advanced RFI and Chargeback Management Platform", Business Wire (May 28, 2012).
Cao et al., "Optimal Power Allocation and Load Distribution for Multiple Heterogeneous Multicore Server Processors across Clouds and Data Centers", IEEE Transactions on Computers, Jan. 2014, vol. 63, No. 1, pp. 45-58.

\* cited by examiner

SYSTEMS AND METHODS FOR FUND TRANSFERS

CROSS REFERENCE TO RELATED APPLICATIONS

The current application is a continuation of U.S. patent application Ser. No. 16/588,797, filed Sep. 30, 2019, entitled "Systems and Methods for Fund Transfers" to Driggs et al., which is a continuation of U.S. patent application Ser. No. 14/820,333, filed Aug. 6, 2015, entitled "Systems and Methods for Fund Transfers" to Driggs et al., the disclosure of which is incorporated herein by reference in its entirety.

FIELD OF THE INVENTION

The present disclosure relates generally to financial services systems, and relates, more particularly, to transferring funds.

BACKGROUND

The financial services industry provides a plethora of financial services to consumers for managing their finances and engaging in financial transactions with retailers and service providers. Consumers may hold funds within many different types of accounts at many different types of financial institutions. Consumers may access the funds held in the accounts using many different types of cards, including credit cards, debit cards, gift cards, and other types of cards based on the particular type of account associated with the card. The cards may be issued from financial institutions, such as banks, credit unions, savings & loans, and brokerage institutions.

A payment processor is a company that handles transactions for one or more financial institutions. Many payment processors have connections to various card associations and supply authorization and settlement services to the financial institutions. Several payment processors facilitate the movement of funds between payment processors and financial institutions. Payment processors can verify aspects of proposed transactions. Once the payment processor has received confirmation or denial of the verification, the information can be relayed to the financial institution that can then complete or invalidate the payment transaction accordingly.

SUMMARY OF THE INVENTION

Turning now to the drawings, systems and methods for securely transferring funds in accordance with embodiments of the invention are illustrated. In one embodiment, a method for conducting peer-to-peer transfers includes obtaining a cash-out request data using a fund transfer server system, wherein the cash-out request data includes target account data and fund data, the target account data includes metadata identifying a consumer account and specifies an account to which funds will be provided, the fund data describes the funds to be provided in response to redeeming the cash-out request, and the fund transfer server system includes a processor and a memory connected to the processor, generating a cash-out code based on cash-out request data using the fund transfer server system, providing the cash-out code using the fund transfer server system, obtaining cash-out code redemption data using the fund transfer server system, wherein the cash-out code redemption data identifies the provided cash-out code, and transmitting a request to provide the funds described by the fund data using the fund transfer server system.

In an additional embodiment of the invention, the method further includes obtaining cash-in request data using the fund transfer server system, where the cash-in request data includes metadata identifying a target account and fund data describing the funds associated with the cash-in request, transmitting the funds to an internal funding account using the fund transfer server system, and generating the cash-out request data based on the cash-in request data using the fund transfer server system.

In another embodiment of the invention, the method further includes verifying the cash-out request data by obtaining verification data using the fund transfer server system, wherein verification data includes a set of verification factors, generating a set of scores based on the set of verification factors using the fund transfer server system, and verifying the cash-out request data based on the set of scores using the fund transfer server system.

In yet another additional embodiment of the invention, the method further includes performing fraud detection by obtaining verification data using the fund transfer server system, wherein the verification data includes a set of fraud detection factors, generating a set of scores based on the set of fraud detection factors using the fund transfer server system, calculating a fraud score based on the set of scores using the fund transfer server system, and determining if the cash-in code is fraudulent by comparing the fraud score to a threshold score using the fund transfer server system.

In still another additional embodiment of the invention, the method further includes identifying the target account by querying a generated code database based on the cash-out code using the fund transfer server system, retrieving metadata associated with the cash-out code from a generated code database using the fund transfer server system, and comparing the retrieved metadata with the cash-out code redemption data using the fund transfer server system.

In yet still another additional embodiment of the invention, the method further includes transmitting notification data to a client device using the fund transfer server system, wherein the notification data can be utilized to display details regarding the cash-out request data using the client device.

In yet another embodiment of the invention, the client device is associated with the identified consumer account.

In still another embodiment of the invention, the method further includes displaying the cash-out code using a client device associated with the consumer account.

In yet still another embodiment of the invention, the displayed cash-out code is provided to a point of sale terminal using the client device and the cash-out code causes the point of sale terminal to provide the funds identified in the cash-out code to be provided by the point of sale terminal in response to the presentation of the cash-out code.

In yet another additional embodiment of the invention, the cash-out code further includes metadata identifying when the cash-out code is displayed and a time period in which the cash-out code is valid and when the cash-out code is provided to the point of sale terminal within the time period, providing the funds using the point of sale terminal.

Still another embodiment of the invention includes a fund transfer server system, including a processor and a memory connected to the processor and storing a fund transfer application, wherein the fund transfer application directs the processor to obtain a cash-out request data, wherein the cash-out request data includes target account data and fund data, the target account data includes metadata identifying a consumer account and specifies an account to which funds will be provided, and the fund data describes the funds to be provided in response to redeeming the cash-out request, generate a cash-out code based on cash-out request data, provide the cash-out code, obtain cash-out code redemption data identifying the provided cash-out code, and transmit a request to provide the funds described by the fund data.

In yet another additional embodiment of the invention, the fund transfer application further directs the processor to obtain cash-in request data including metadata identifying a target account and fund data describing the funds associated with the cash-in request, transmit the funds to an internal funding account, and generate the cash-out request data based on the cash-in request data.

In still another additional embodiment of the invention, the fund transfer application further directs the processor to verify the cash-out request data by obtaining verification data including a set of verification factors, generating a set of scores based on the set of verification factors, and verifying the cash-out request data based on the set of scores.

In yet still another additional embodiment of the invention, the fund transfer application further directs the processor to perform fraud detection by obtaining verification data including a set of fraud detection factors, generating a set of scores based on the set of fraud detection factors, calculating a fraud score based on the set of score, and determining if the cash-in code is fraudulent by comparing the fraud score to a threshold score.

In yet another embodiment of the invention, the fund transfer application further directs the processor to identify the target account by querying a generated code database based on the cash-out code, retrieving metadata associated with the cash-out code from a generated code database, and comparing the retrieved metadata with the cash-out code redemption data.

In still another embodiment of the invention, the fund transfer application further directs the processor to transmit notification data to a client device and the notification data can be utilized to display details regarding the cash-out request data using the client device.

In yet still another embodiment of the invention, the client device is associated with the identified consumer account.

In yet another additional embodiment of the invention, the fund transfer application further directs the processor to display the cash-out code using a client device associated with the consumer account.

In still another additional embodiment of the invention, the displayed cash-out code is provided to a point of sale terminal using the client device and the cash-out code causes the point of sale terminal to provide the funds identified in the cash-out code to be provided by the point of sale terminal in response to the presentation of the cash-out code.

In yet still another additional embodiment of the invention, the cash-out code further includes metadata identifying when the cash-out code is displayed and a time period in which the cash-out code is valid and when the cash-out code is provided to the point of sale terminal within the time period, providing the funds using the point of sale terminal.

DETAILED DESCRIPTION

Figure 1:
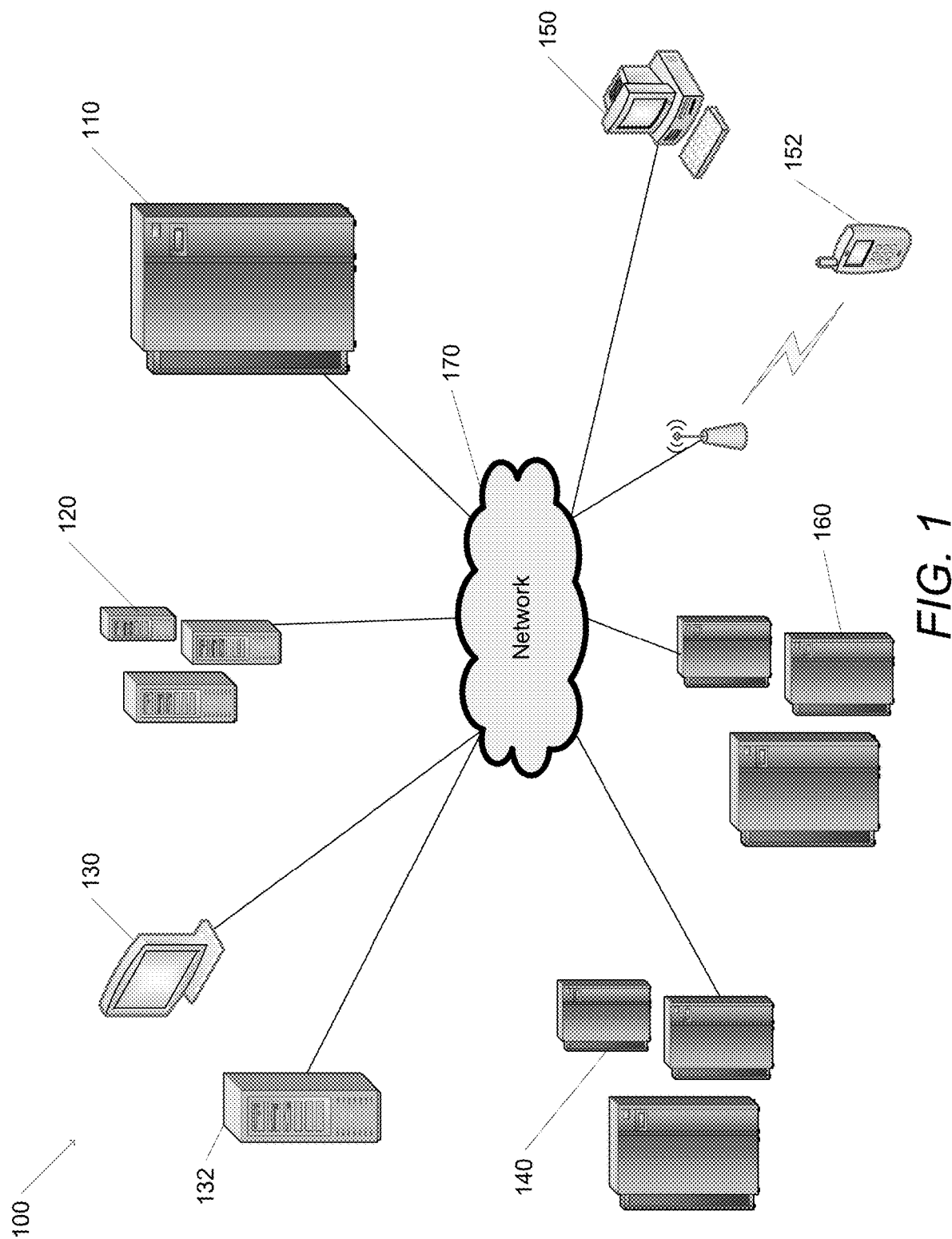
FIG. 1 is a conceptual illustration of a fund transfer system in accordance with an embodiment of the invention.

Turning now to the drawings, systems and methods for securely transferring funds in accordance with embodiments of the invention are illustrated. Currently available techniques for transferring funds, such as money orders, allow consumers to transfer funds anonymously. These processes work by having one consumer purchase a redeemable token, such as a money order, for a particular value. The token is later redeemable on presentation of the token. A problem with such systems is that there can be significant opportunities to conduct fraudulent activities due to a lack of identification regarding the purchaser of the token, the intended recipient of the token, and limited means to authenticate the token in real-time. For example, fraudulent money orders can be used in scams as a fake form of payment. Money orders can also be used in a variety of scams, such as 419 scams and IRS impersonation scams, allowing the perpetrators acquire funds from victims anonymously and without being traced.

Fund transfer systems in accordance with embodiments of the invention are capable of securely providing and tracking requests for and/or the redemption of funds. In order to prevent instances of fraudulent or unverified transfers, a variety of verification processes can be utilized to secure and verify transfers. One such technique utilized in fund transfer systems includes generating codes, including cash-in codes and cash-out codes, to facilitate the process of providing and redeeming funds. Cash-in codes can be used to request that funds be provided to a consumer account. Similarly, cash-out codes can be used to redeem money being provided to a consumer account. In several embodiments, cash-in codes and/or cash-out codes can be tracked and stored in a database. This database of codes can be utilized to track and/or verify codes.

Additionally, a variety of security measures can be employed with the codes in order to limit the ability of nefarious actors to generate, copy, or otherwise accumulate codes in a fraudulent manner. One such security measure includes associating a redemption time with the generated codes. On generating (or displaying) the code, a limited window, such as ten minutes or one hour, can be provided in which the code can be redeemed. This allows for codes that can only be obtained and redeemed when the consumer presenting the code is proximate to a location for redeeming the code. In this way, the ability for codes to be transmitted to and accumulated by nefarious actors is limited. Additionally, this induces a requirement that the codes be honestly redeemed as the redemption process often includes presenting the generated code at a point of sale terminal (or any other kiosk) at a retail establishment associated with the fund transfer system. This further limits the ability of the generated codes to be used fraudulently as the physical description and location of the consumers (and/or consumer devices) that are the originators and/or targets of the generated codes can be easily obtained during the requesting and/or redemption of the codes.

In many embodiments, the generated codes can be associated with one or more consumer accounts. Consumer accounts can contain identification data about a user. In a number of embodiments, a code can be generated by a consumer (or any other entity) that is not associated with a consumer account. In several embodiments, consumer accounts can be automatically generated based on identification data obtained during the request for a generated code. This consumer account data can be utilized to assist in identifying fraudulent activity. Fund transfer systems can acquire data from a variety of sources, including partner systems, which can be used detect fraudulent activity.

Fund transfer systems in accordance with a variety of embodiments of the invention include fund transfer server systems that can communicate with external systems and isolate those communications from payment processor systems and/or financial institution systems. External systems include point of sale systems, client devices, retailer systems, and any other system that can be utilized to obtain and/or display data regarding a consumer account as appropriate to the requirements of specific applications of embodiments of the invention. Fund transfer systems can abstract and isolate payment processor systems and/or financial institution systems from the account servicing server system utilizing a banking platform interface. The banking platform interface can allow an account servicing server system to seamlessly communicate with multiple payment processor systems and/or financial institution systems by translating internal command data to payment processor system (and/or financial institution system) command data. The banking platform interface allows for the dynamic routing of communication between external systems, account servicing server systems, and payment processor systems and/or financial institution systems as appropriate to the requirements of specific applications of embodiments of the invention. Additionally, the fund transfer system can then automatically prepare (and/or translate) data provided as part of the services to command data that is utilized by payment processor systems to execute the requested services. In a variety of embodiments, a payment processor system identifies an external account using processor account identifier data. The same external account can also be identified by a fund transfer server system using account identifier data. Using the banking platform interface, the account servicing server system can dynamically map account identifier data and processor account identifier data in order to identify particular external accounts. Systems and methods for providing banking platform interfaces that can be utilized in accordance with embodiments of the invention are described in U.S. patent application Ser. No. 14/718,811, titled "Systems and Methods for Banking Platform Isolation" and filed May 21, 2015.

In many embodiments, fund transfer systems can detect account activity and target advertising to client devices associated with the active accounts based on location information associated with or implied by the account transactions (e.g. the location of a point of sale terminal and/or a client device at the time of the transaction), available account balances, and/or available funding sources. In this way, the fund transfer systems allow advertisers to programmatically target advertisements based on the location of a consumer and/or the funds available to the consumer account. In several embodiments, fund transfer systems directly target advertising to consumer accounts and/or client devices associated with consumer accounts. In a number of embodiments, the fund transfer systems provide account identification data identifying consumer accounts and/or client devices associated with consumer accounts as targets to advertising networks that target advertisements to the identified consumer accounts. In accordance with the requirements of specific applications of embodiments of the invention, advertising data includes one or more offers that can be redeemed by a consumer account. Offers can include, but are not limited to, offers that can be redeemed to obtain a discount on particular goods and/or result in a credit to the consumer account's account. In a variety of embodiments, advertising data includes a set of offers, where an offer includes a mapping between a particular product and a discount to be applied to the purchase of that product. That is, advertising data can include a set of mappings between product data describing products and offer data describing offers applicable to the products. Account servicing systems can analyze a consumer account's financial transactions and apply offers to the consumer account's account and/or transactions based on transactions that satisfy the criteria of previously presented (and/or accepted) offers presented to the consumer account. In this way, fund transfer systems can facilitate the redemption of offers associated with advertising presented to consumer accounts, thereby encouraging consumer accounts to shop at particular retailers. Systems and methods for targeting advertising that can be utilized in accordance with embodiments of the invention are described in U.S. patent application Ser. No. 14/587,945, titled "Systems and Methods for Targeting Advertising to Prepaid Card Accounts" and filed Dec. 31, 2014.

The disclosures of U.S. patent application Ser. No. 14/587,945 and Ser. No. 14/718,811 are hereby incorporated by reference in their entirety. Systems and methods for transferring funds in accordance with embodiments of the invention are described in more detail below.

Fund Transfer Systems

Transferring funds can involve communication between many different parties (e.g., banks, corporations, processors, consumers, etc . . . ) prior to funds being transferred between two or more accounts. For example, a fund transfer request associated with a consumer account can be generated at a client device may require communication with financial systems, retailer systems, retailer sever systems, payment processing systems, or any other system as appropriate to the requirements of specific embodiments of the invention. In several embodiments, fund transfer requests include cash-in requests and cash-out requests. As described in more detail below, cash-in requests provide a facility for depositing money to a third party, while cash-out requests provide a facility for obtaining money from a third party.

Turning now to FIG. 1, a conceptual illustration of a fund transfer system in accordance with an embodiment of the invention is shown. The fund transfer system 100 includes fund transfer server system 110, payment processor systems 120, retailer systems such as point of sale terminals 130, and retailer server systems 132, financial institution systems 140, and client devices including, but not limited to, personal computers 150 and mobile devices 152. In many embodiments, fund transfer system 100 includes partner systems 160. These systems communicate through one or more networks 170. Network(s) 170 can include, but are not limited to, the Internet, a local area network, a wide area network, and networks that are shared privately between only a subset of the systems. For example, in many embodiments of the invention, the retailer server system 132 can communicate with the retailer systems 130, fund transfer server system 110, and financial institution systems 140 via one or more private networks.

Fund transfer server system 110 provides front-end and back-end services for transferring funds between accounts via a number of fund transfer serving processes as appropriate to the requirements of specific applications of embodiments of the invention. In many embodiments of the invention, fund transfer server system 110 can generate consumer accounts. In a plurality of embodiments, the amount of funds available in a consumer account is designated based, in whole or in part, on communication with retailer systems 130, and client devices. Fund transfer server system 110 can transfer funds between wide varieties of accounts, including, but not limited to, consumer accounts, internal funding accounts generated by the fund transfer server system 110, financial accounts managed by financial institution systems 140, and any other account as appropriate to the requirements of specific applications of embodiments of the invention. In many embodiments, consumer accounts are internal funding accounts generated by the fund transfer server system 110. A variety of fund transfers including, but not limited to, loading funds to a third-party financial account managed by a financial institution system 140, peer-to-peer transfers, and transferring funds with bill paying functionality, and any other type of fund transfer can be executed as appropriate to the requirements of specific embodiments of the invention. In many embodiments of the invention, the fund transfer server system can detect fraudulent communications over the network 170.

The fund transfer server system 110 can also provide an interface providing consumer account data, cash-in codes, cash-out codes, cash-in code redemption data, cash-out code redemption data, and any other data related to fund transfers and/or accounts as appropriate to the requirements of specific applications of embodiments of the invention. In a number of embodiments, the interface can be used to initiate fund transfers between specified accounts. The fund transfer server system 110 can acquire data from a variety of sources, including, but not limited to, retailer systems, financial institution systems 140, client devices, as well as any other data source as appropriate to requirements of specific embodiments of the invention. The fund transfer server system 110 can use the acquired data to verify the transfer. If the fund transfer server system 110 determines that there is a potentially fraudulent transfer being requested, the fund transfer server system 110 can halt the transfer, generate notifications regarding the potentially fraudulent transfer, and/or take any other responsive step as appropriate to requirements of specific embodiments of the invention.

In many embodiments, the fund transfer server system 110 generates an account in order to hold funds used in the transfer. The fund transfer server system 110 can acquire funds via a variety of systems, including, but not limited to, retailer systems and/or financial institution systems 140. In a plurality of embodiments, the fund transfer server system 110 acquires data describing the funds being transferred from a variety of sources, including, but not limited to, retailer systems, financial institution systems 140, client devices, as well as any other data source as appropriate to requirements of specific embodiments of the invention. In multiple embodiments, the fund transfer server system 110 utilizes data describing the funds being transferred to verify the transfer prior to accepting funds. If the fund transfer server system 110 determines that the transfer is not verified, the fund transfer server system 110 can halt the transfer and/or take any other responsive step as appropriate to requirements of specific embodiments of the invention. If the fund transfer server system 110 determines that the transfer is verified, the fund transfer server system 110 can facilitate the transfer from the generated account to the specified target account. Notifications can also be generated regarding the failure or success of the transactions as appropriate to the requirements of specific applications of embodiments of the invention.

Payment processor system 120 can process transactions on behalf of financial institution systems 140, retailer systems, fund transfer server systems, and many other types of financial institutions. Payment processor systems 120 provide a transaction interface that can be utilized to process transaction data. The transaction data can be obtained from any system, including, but not limited to, the retailer systems, financial institution systems 140, and client devices. Processing transaction data can include determining if a transaction should be authorized. In many embodiments, the transfer of funds can include transmitting requests to one or more financial institution systems 140, and/or any other account management system in order to execute the requested transaction.

Retailer systems, such as point of sale terminal (or any other kiosk) 130, can be used to generate and redeem codes associated with transfer requests. Point of sale terminals 130 can transmit fund data describing the funds being transferred to the retailer server system 132 and/or the fund transfer server system 110. The fund data includes, but is not limited to, the amount of funds received, identification data associated with the request, and/or metadata identifying the targeted consumer account. In a plurality of embodiments, point of sale terminals 130 can scan cash-in codes and/or cash-out codes. In several embodiments, retailer systems generate cash-in code redemption data and/or cash-out code redemption data when a cash-in code and/or a cash-out code is scanned. In a variety of embodiments, the retailer server system 132 obtains cash-in code redemption data and/or cash-out code redemption data from a point of sale terminal 130. In many embodiments, point of sale systems can accept cash. However, point of sale systems can accept funds from any funding source, including, but not limited to, financial accounts, credit cards, debit cards, checks, pre-paid cards, and any other funding source as appropriate to the requirements of specific applications of embodiments of the invention.

Financial institution systems 140 include financial accounts for one or more entities. These financial accounts hold funds on behalf of the entities and can transfer funds to retailer systems, send or receive funds from the fund transfer server system 110, or perform any other fund transfer as appropriate to the requirements of specific applications of embodiments of the invention. In many embodiments, financial institution systems 140 can transmit data describing accounts held to the fund transfer server system 110. In various embodiments of the invention, financial service systems 110 include, but are not limited to, banks, credit unions, and third party payment systems such as, but not limited to, PayPal by PayPal, Inc. located in San Jose, California and Google Wallet by Google, Inc. located in Mountain View, California.

Client devices can be used to manage fund transfers, view consumer account data, view historical transfers, or any other operations as appropriate to the requirements of specific applications of embodiments of the invention. Furthermore, client devices can obtain and display notifications to the device via a variety of techniques including, but not limited to, push notifications, email, short message service (SMS) messages, and multimedia message service (MMS) messages. In many embodiments, the client device receives messages regarding requested transfers including, but not limited to, transfer requests being received, transfers complete, transfers failed, instructions for completing transfers, and any other message data as appropriate to the requirements of specific applications of embodiments of the invention. In numerous embodiments, client devices can obtain and/or display cash-in and/or cash-out codes.

Partner systems 160 can be law enforcement systems, regulatory agency systems, payment processor systems, and/or any other system capable of providing partner system data as appropriate to the requirements of specific embodiments of the invention. These partner systems provide publicly and/or privately accessible databases of information that can be accessed utilizing profile information associated with a consumer account to gain insights into the consumer account as appropriate to the requirements of specific applications of embodiments of the invention.

In many embodiments, consumer accounts are serviced by financial institution systems 140 and/or the account servicing server system 110. In a plurality of embodiments, fund transfer server systems 110 hold accounts. Consumer account data can include, but is not limited to, amount of funds in the account, the consumer account associated with the account, transaction history, and any other piece of account related data as appropriate to the requirements of specific embodiments of the invention. When funds are deposited or funds are withdrawn from an account, fund transfer server systems 110 can manipulate the account data to reflect the movement of funds.

Although a specific architecture of a fund transfer system in accordance with embodiments of the invention are discussed above and illustrated in FIG. 1, a variety of architectures, including user devices not specifically named, can be utilized in accordance with embodiments of the invention. Furthermore, it should be noted that any data created and/or transferred within the system can be provided in any manner (i.e. via one or more application programming interfaces (APIs), web services, and/or file-based interfaces) as appropriate to the requirements of specific applications of embodiments of the invention.

Fund Transfer Server Systems

As described above, fund transfer server systems can provide a variety of fund transfer services. A fund transfer server system in accordance with an embodiment of the invention is conceptually illustrated in FIG. 2. The fund transfer server system 200 includes a processor 210 in communication with a network interface 220 and a memory 230. The network interface 220 can send and receive data over a network connection. In a number of embodiments, memory 230 is any form of storage that can store a variety of data, including, but not limited to, a fund transfer application 232, consumer account data 234 and a generated code database 236. In many embodiments, memory 230 also stores verification data 238.

The fund transfer application 232 directs the processor 210 to perform a variety of fund transfer processes. The fund transfer processes can include generating cash-in codes and/or cash-out codes along with tracking and processing the generated codes. The fund transfer processes can also include creating and/or managing consumer account data 234. Consumer account data 234 can include, but is not limited to, descriptions of fund transfer history, associated account data, demographic data, employment information, credit status, income information, mailing address, associated consumer accounts, associated accounts held by third-party financial institution systems, and/or any other consumer profile pertinent information. Consumer account data 234 can include data received from a variety of different sources, including client devices, retailer systems, financial institution systems, and any other of a variety of other sources as appropriate to the requirements of specific applications of embodiments of the invention.

Fund transfer processes can also include generating cash-in codes and cash-out codes. Cash-in codes and cash-out codes can be linear bar codes, such as a Universal Product Code (UPC), matrix bar codes such as Quick Response (QR) codes, alphanumeric strings, or any other type of code as appropriate to requirements of specific embodiments of the invention. Cash-in codes can include a variety of data including requesting party data, target account data, deposit amount data, data identifying who can redeem the code, location data describing where the code was requested and/or can be redeemed, and/or any of a variety of security data. Cash-out codes can include a variety of data, including the requesting party data, target account data, redemption party data identifying who can redeem the code, location data describing where the code was requested and/or can be redeemed, and/or any of a variety of security data. Target account data identifies the consumer account that is the intended recipient of the generated code. Security data can include any of a variety of data, such as a code creation timestamp, a code expiration timestamp, geolocation data, and any other data as appropriate to the requirements of specific applications of embodiments of the invention.

Generated codes can be stored in a generated code database 236. The generated code database 236 can be utilized to record and track a variety of generated codes as appropriate to the requirements of specific applications of embodiments of the invention. In particular, the generated code database 236 can facilitate the authorization of fund transfers and help identify fraud utilizing a variety of fund transfer processes described in more detail below. In a variety of embodiments, the security data associated with the cash-in codes and/or cash-out codes can be stored as metadata in the generated code database 236 instead of being stored along with the codes. In this way, the decoupling of the security data from the codes themselves can be further secured as the security data associated with the codes is not available for inspection upon receiving the codes. In a number of embodiments, all data associated with cash-codes and/or cash-out codes are stored as metadata in the generated code database 236 instead of being stored along with the codes. Stored metadata can include, but is not limited to, routing instructions and/or target account data. In a plurality of embodiments, cash-in codes and/or cash-out codes are keys to the associated data stored in the generated code database 236. In several embodiments, the transmitted cash-in and/or cash-out codes are random strings of characters that are unrelated to the data stored in the database corresponding to the generated codes. In a variety of embodiments, some or all of the generated data are encoded to create the transmitted cash-in and/or cash-out codes.

In numerous embodiments, fund transfer processes include using verification data 238 to verify fund transfers. Verification data can include, but is not limited to, client device identifying information, law enforcement data, regulatory data, transaction histories, retailer system information, or any other data that can be used to verify fund transfers. In a variety of embodiments, verification data is obtained from retail systems, financial institution systems, payment processing systems, or any other system as appropriate to the requirements of specific embodiments of the invention. In a variety of embodiments, the verification data includes publicly- and/or privately-available data obtained from any of a variety of partner systems.

Figure 2:
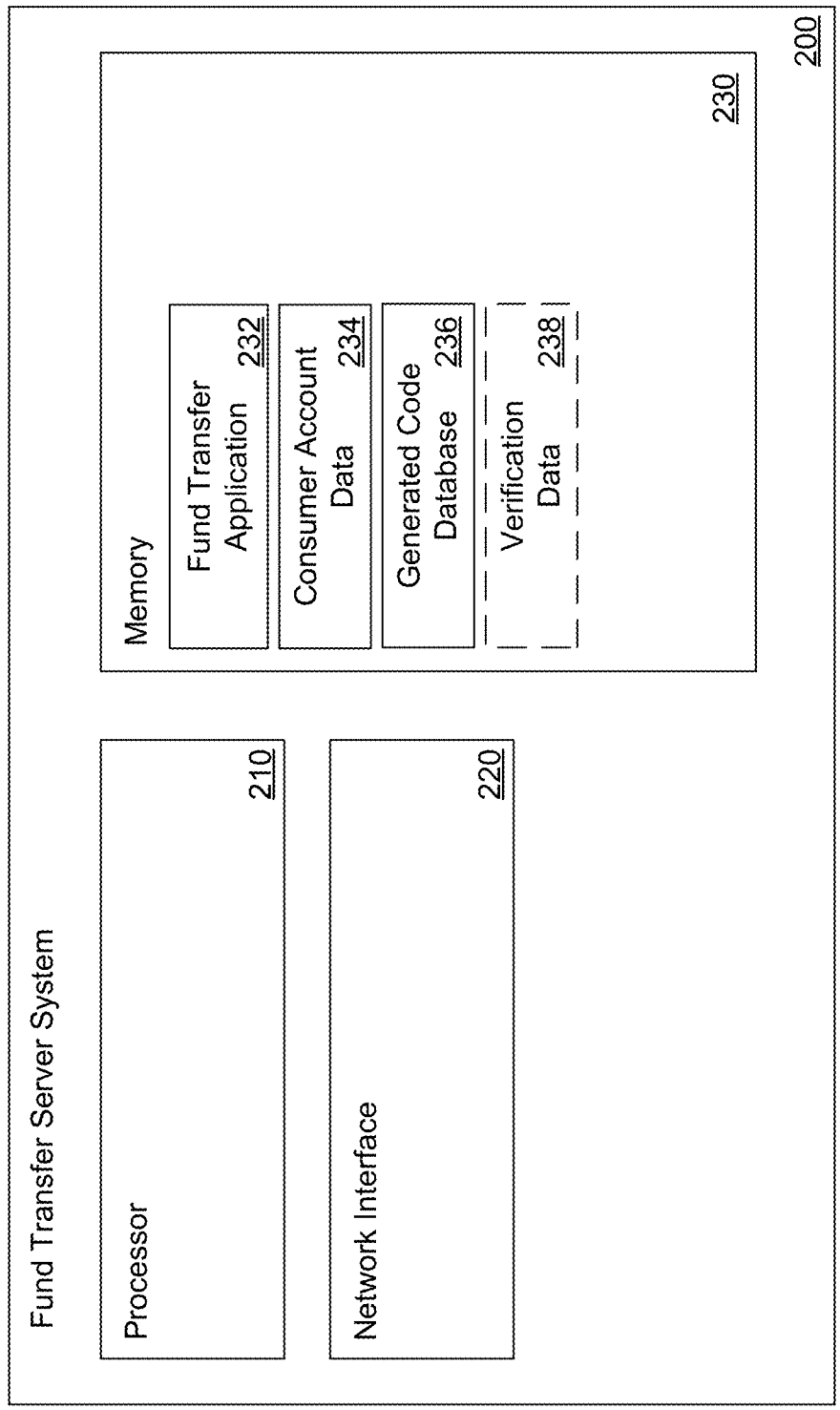
FIG. 2 is a conceptual illustration of a fund transfer server system in accordance with an embodiment of the invention.

Although a specific architecture for a fund transfer server system in accordance with an embodiment of the invention is conceptually illustrated in FIG. 2, any of a variety of architectures, including those that store data or applications on disk or some other form of storage and are loaded into memory at runtime, can also be utilized. In a variety of embodiments, the memory 230 includes circuitry such as, but not limited to, memory cells constructed using transistors that are configured to store instructions. Similarly, the processor 210 can include logic gates formed from transistors (or any other device) that can dynamically perform actions described by the instructions. In this way, the systems and methods described herein can be performed utilizing both general-purpose computing hardware and by single-purpose devices.

A variety of fund transfer processes in accordance with embodiments of the invention are described in more detail below.

Fund Transfer Examples

A variety of types of fund transfers can be performed using fund transfer systems, including, but not limited to, transfers to accounts held by financial institution systems, peer-to-peer (P2P) transfers, and bill payment. The following are provided by way of example only.

Transfers to Accounts Held by Financial Institution Systems

One example of a fund transfer process includes transferring funds accounts held by financial institution systems. Cash-out code request data associated with a consumer account can be obtained. The cash-out code request data can describe an account held by a financial institution system. In many embodiments, the account held by the financial institution system is associated with the requesting consumer account. In a number of embodiments, the account held by the financial institution system is associated with a different consumer account than the requesting consumer account. A cash-out code can be generated which can be redeemed with funds to be transferred. The funds can then be deposited (i.e. loaded) into the account held by the financial institution system.

Peer-to-Peer Transfers

An example of a fund transfer process includes conducting P2P fund transfers. In a plurality of embodiments, cash-in request data associated with a first consumer account is obtained and used to generate a cash-in code using processes similar to those described below. The cash-in code can be transmitted to a client device associated with a second consumer account identified as a fund source. The cash-in code can be redeemed, allowing a transfer of funds from the fund source to an account held for the first consumer account. In many embodiments, fund transfer systems obtain cash-out request data associated with a first consumer account specifying a target account associated with a second consumer account. A cash-out code can be generated that, when redeemed, transfers funds associated with the first consumer account to the account held for the second consumer account.

Bill Payment Services

A third example of a fund transfer process includes providing bill payment services. Bill payment services can include allowing a third party system (such as a utility provider) to generate a cash-in code that can be included with a customer's bill. The cash-in code can identify the financial account associated with the third party system along with the consumer's account information for the service(s) provided by the third party. The consumer can then take their bill and cash-in code to a retailer along with their desired method of payment, such as a prepaid card, credit card, or cash. The consumer can present the cash-in code along with their payment to a cashier, who can then scan the cash-in code and accept the customer's payment. The scanning of the cash-in code causes the fund transfer server system to transmit the tendered payment to the financial institution system identified in the cash-in code. In this way, the consumer can easily pay their bills when and where it is convenient for them, such as during their regular grocery trip.

Although a variety of fund transfer examples are described above, fund transfer systems can execute a wide variety of fund transfer processes as described in more detail below.

Generating Cash-In Codes

A variety of fund transfer processes include requesting funds from a consumer account. Cash-in codes can be used to request funds to be deposited to a consumer account. The requested funds can be provided in any of a variety of sources, such as by transferring funds from a consumer account, an account held at a financial institution system, or by providing cash at a retailer.

Figure 3:
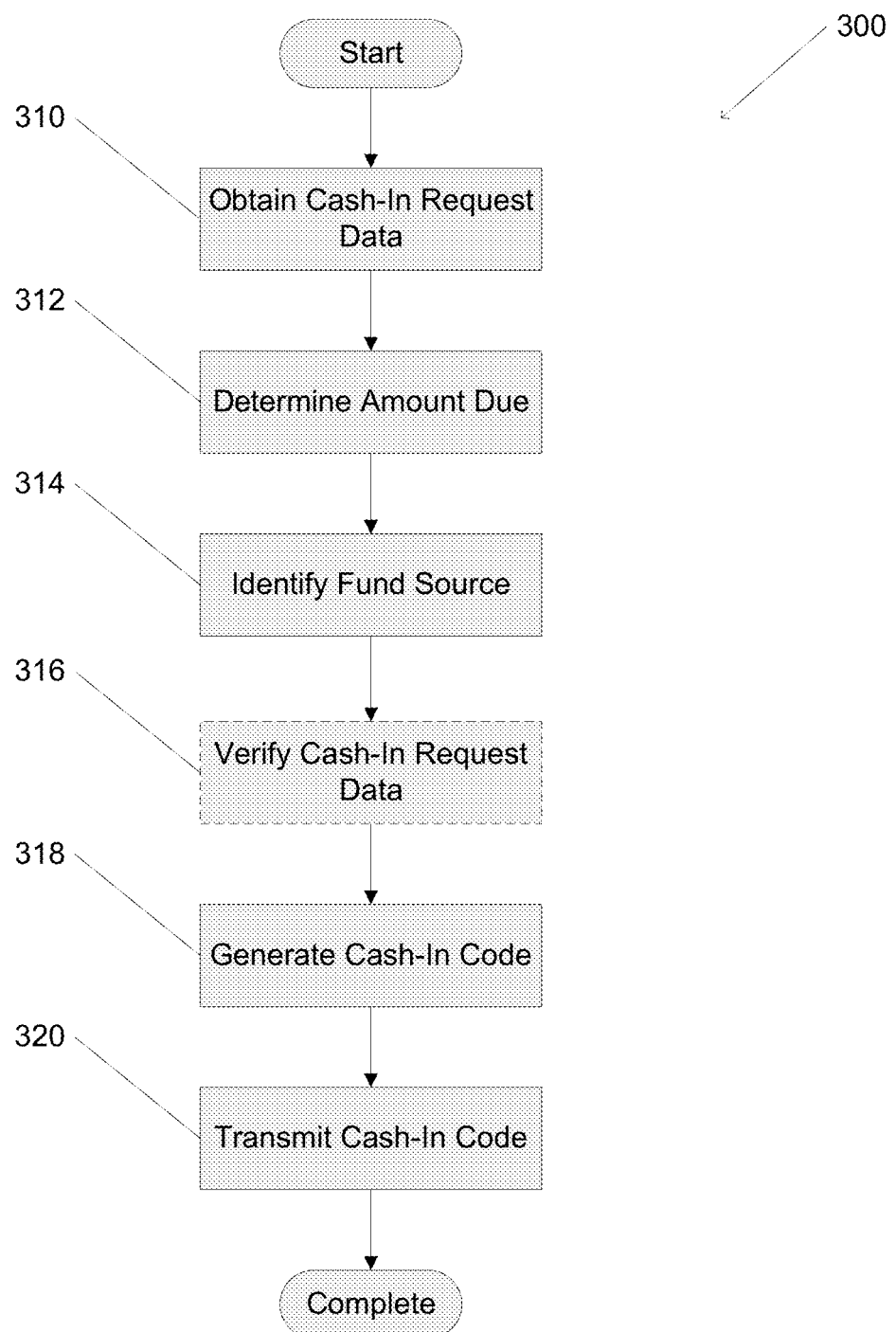
FIG. 3 is a flow chart illustrating a process for generating cash-in codes in accordance with an embodiment of the invention.

A process for generating cash-in codes in accordance with an embodiment of the invention is shown in FIG. 3. The process 300 includes obtaining (310) cash-in request data. In a number of embodiments, cash-in request data is associated with a consumer account. In numerous embodiments, cash-in request data is obtained from a client device associated with the consumer account. In a variety of embodiments, cash-in request data is obtained from a retailer system. Cash-in request data can include, but is not limited to, consumer account data, data describing the amount of funds to be deposited, the source of the funds, the location that the request was generated from, and/or any other data as appropriate to the requirements of specific applications of embodiments of the invention. An amount due to be obtained upon redemption of the cash-in code can be determined (312). In several embodiments, this amount can be specified in the cash-in request data and/or calculated based on the cash-in request data. A fund source can be identified (314). In numerous embodiments, the source of funds is a consumer account, although any funding account held by any financial institution system can be utilized as appropriate to the requirements of specific applications of embodiments of the invention. In a variety of embodiments, the funds are requested as part of a bill pay service identifying an account at a third-party system.

In a plurality of embodiments, cash-in request data can be verified (316). Fund transfer processes can verify cash-in request data in a variety of ways. In many embodiments, verification data is obtained. Verification data can include a set of verification factor including, but not limited to, the amount of funds able to be transferred by the fund source, the amount of funds able to be received by the consumer account associated with the cash-in request data, if transfers are allowed to the specified consumer account, and/or any other factor as appropriate to the requirements of specific applications of embodiments of the invention. A set of scores can be generated based on the factors described by the verification data. Techniques for utilizing the generated scores to verify transactions and/or determine fraud are described in more detail below.

Cash-in codes can be generated (318). In many embodiments, cash-in codes are generated based on the obtained cash-in request data, the determined amount due, and the identified fund source. Generated cash-in codes can be stored in a generated code database. Cash-in codes can be transmitted (320). In numerous embodiments, the cash-in code can be transmitted to a consumer account associated with the fund source. In a variety of embodiments, the cash-in code can be transmitted to a client device associated with the targeted consumer account and/or fund source.

Specific processes for generating cash-in codes are described above; however, any number of processes, including those that use alternative factors for verifying the cash-in request data, can be utilized as appropriate to the requirements of specific applications in accordance with embodiments of the invention.

Generating Cash-Out Codes

Fund transfer processes can include generating cash-out codes to provide funds to consumer accounts. The provided funds can be provided using any of a variety of sources, such as transferring funds to a consumer account, an account held at a financial institution system, or by providing cash at a retailer in response to redeeming the cash-out codes.

Figure 4:
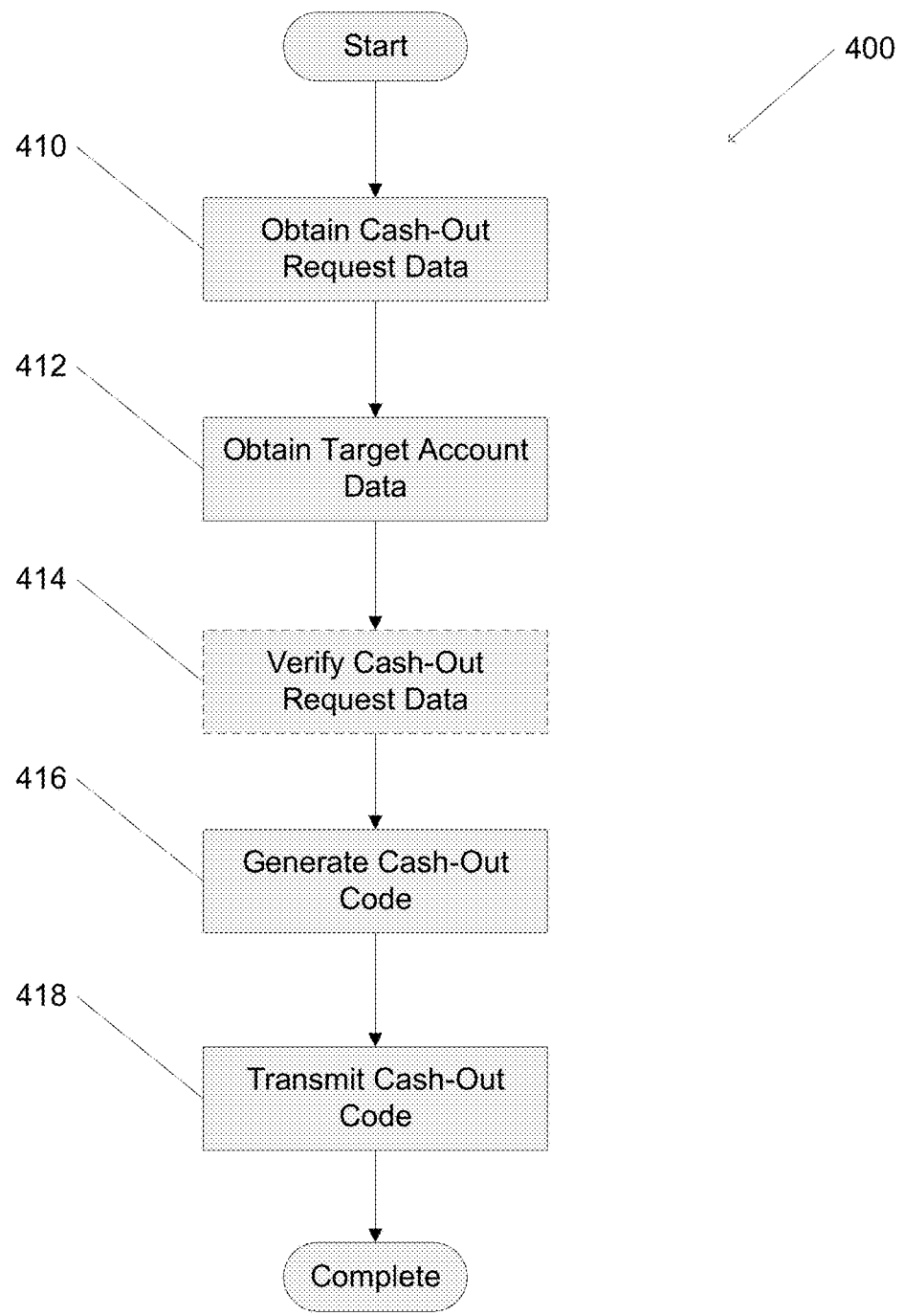
FIG. 4 is a flow chart illustrating a process for generating cash-out codes in accordance with an embodiment of the invention.

A process for generating cash-out codes in accordance with an embodiment of the invention is show in FIG. 4. The process 400 includes obtaining (410) cash-out request data. Cash-out request data can be obtained from a variety of sources, including, but not limited to, retailer systems, client devices, payment processor systems, financial institution systems, or any other system as appropriate to the requirements of specific embodiments of the invention. In numerous embodiments, cash-out request data includes fund data describing the amount of funds being provided, a target account to which the funds will be provided, the location at which the funds can be redeemed, a timestamp indicating a time (or times) when the funds can be redeemed, and any other data related to the cash-out request data as appropriate to the requirements of specific applications of embodiments of the invention. In a number of embodiments, cash-out request data includes a description of held funds available to be transferred.

Target account data can be obtained (412). Target account data can describe an account into which funds will be transferred, and can include consumer account metadata describing a consumer account associated with the account to which funds will be provided. In many embodiments, the target account data is obtained from cash-out request data. In a plurality of embodiments, target account data can be acquired separately from a variety of sources, such as client devices, and/or inferred from the cash-out request data. In many embodiments, cash-out request data can be verified (414). Fund transfer processes can verify cash-out request data in a variety of ways. In many embodiments, verification data is obtained. Verification data can include a set of verification factors. Verification factors can include a variety of factors such as, but not limited to, the amount of funds able to be transferred by the consumer account associated with the cash-out request data, the amount of funds able to be received by the target account, if transfers are allowed to the target account, and/or any other factor as appropriate to the requirements of specific applications of embodiments of the invention. A set of scores can be generated based on the factors described by the verification data. Techniques for utilizing the generated scores to verify transactions and/or determine fraud are described in more detail below.

Cash-out codes can be generated (416). Cash-out codes can be generated based on cash-out request data and/or target account data. Cash-out codes can be transmitted (418). In several embodiments, cash-out codes are transmitted to a client device associated with the target account data.

Specific processes for generating cash-out codes are described above; however, any number of processes, including those that use alternative factors for verifying the cash-out request data, can be utilized as appropriate to the requirements of specific applications in accordance with embodiments of the invention.

Redeeming Cash-In Codes

Figure 5:
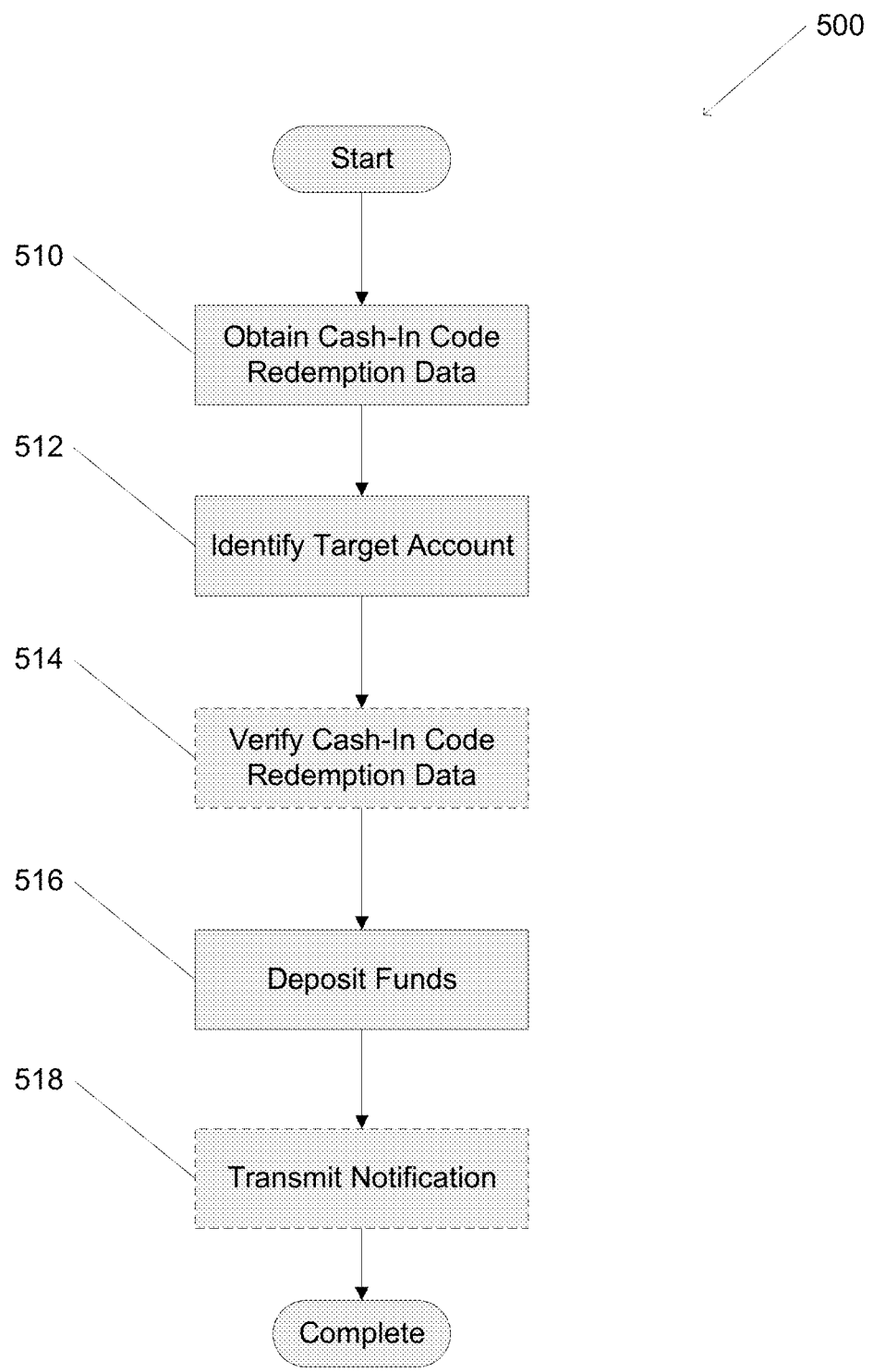
FIG. 5 is a flow chart illustrating a process for processing cash-in codes in accordance with an embodiment of the invention.

Fund transfer processes can include redeeming generated cash-in codes. Redeeming cash-in codes allows funds to obtained and deposited to a target account. The funds that are transferred to the target account can be provided using any of a variety of sources, such as transferring funds to a consumer account, an account held at a financial institution system, or by providing cash at a retailer in response to redeeming the cash-in codes. A process for redeeming cash-in codes in accordance with an embodiment of the invention is illustrated in FIG. 5.

The process 500 includes obtaining (510) cash-in code redemption data. Cash-in code redemption data can include, but is not limited to, a cash-in code, information regarding the location where the cash-in code was redeemed, a timestamp describing the time the cash-in code was redeemed, the consumer account associated with the redemption of the cash-in code, or any other redemption data as appropriate to the requirements of specific embodiments of the invention. In many embodiments, cash-in code redemption data can include, but is not limited to, a description of held funds to be deposited. A target account can be identified (512). In numerous embodiments, target accounts are identified based on cash-in code redemption data. In several embodiments target accounts are identified by querying a generated code database using a cash-in code. A cash-in code can be compared to the generated code database in order to retrieve associated metadata, including, but not limited to, target account data and/or routing instructions.

In a number of embodiments, cash-in code redemption data is verified (514). Cash-in code redemption data can be verified by ensuring that the deposit can occur. Fund transfer processes can verify cash-in code redemption data in a variety of ways. In many embodiments, verification data is obtained. Verification data can include a set of verification factors. Verification factors can include a variety of factors such as, but not limited to, the amount of funds able to be transferred to the target account, the amount of funds to be transferred, if transfers are allowed to the target account, and/or any other factor as appropriate to the requirements of specific applications of embodiments of the invention. A set of scores can be generated based on the factors described by the verification data. Techniques for utilizing the generated scores to verify transactions and/or determine fraud are described in more detail below.

Funds can be deposited (516). In many embodiments, funds are deposited into the identified target account. In a number of embodiments, retrieved metadata is transmitted to the financial institution system holding the target account. In a variety of embodiments, retrieved metadata is further transmitted to the target account. In several embodiments, the funds are deposited in accordance with the redemption data described in the cash-in code redemption data. In many embodiments, the funds are deposited based on routing rules associated with the target account. Systems and methods for routing transactions that can be utilized in accordance with embodiments of the invention are described in U.S. patent application Ser. No. 14/806,459, titled "Systems and Methods for Dynamic Account Routing" and filed Jul. 22, 2015, the disclosure of which is hereby incorporated by reference in its entirety.

In numerous of embodiments, notifications are transmitted (518) to a client device associated with the consumer account associated with the target account indicating that a cash-in code has been redeemed. In numerous embodiments, notification data are transmitted to a client device associated with the cash-in request data that was used in generating the cash-in code described by the cash-in code redemption data. Notification data can include metadata describing the amount transferred, the consumer accounts involved in the transfer, or any other data as appropriate to the requirements of specific embodiments of the invention.

In a plurality of embodiments, a cash-out code is generated based on the redemption of the cash-in code. The target account can be an internal funding account held for the fund transfer server system. Redemption of the cash-in code can result in the funds being deposited into the internal funding account. A cash-out code can then be generated where the target account data associated with the cash-out request data specifies a second target account that is not the internal funding account. In several embodiments, the second target account is described by the cash-in code redemption data. The generated cash-out code can be transmitted to a client device associated with the consumer account associated with the second account using a process similar to the one described below.

Although specific processes for redeeming cash-in codes are described above, any number of processes, including those that do not generate a cash-out code upon redemption of a cash-in code, or those that use alternative factors for verifying the cash-in code redemption data, can be utilized as appropriate to the requirements of specific applications in accordance with embodiments of the invention.

Redeeming Cash-Out Codes

Figure 6:
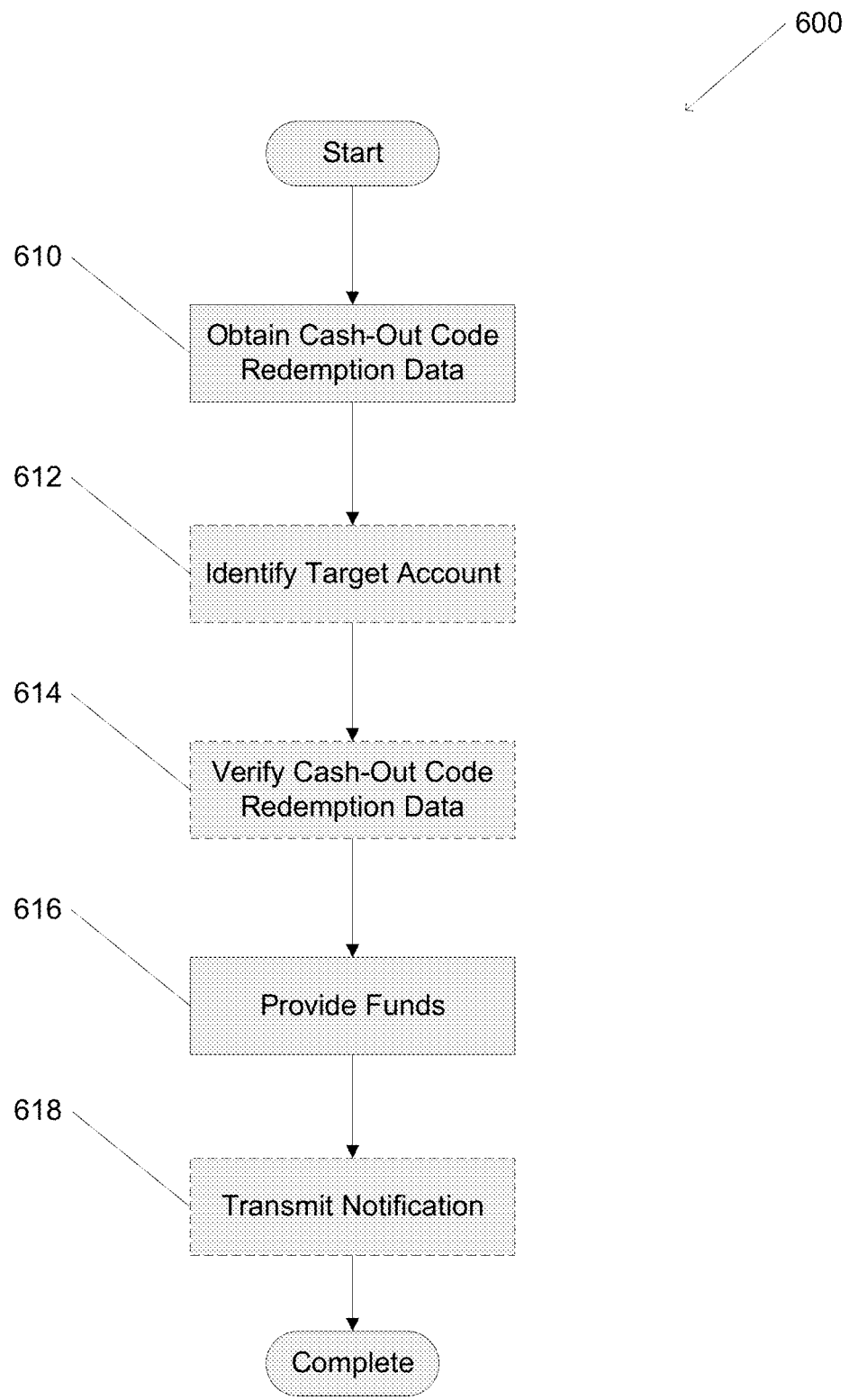
FIG. 6 is a flow chart illustrating a process for redeeming cash-out codes in accordance with an embodiment of the invention.

Fund transfer processes can include redeeming generated cash-out codes. Redeeming cash-out codes allows obtained funds to be transmitted to a specified target account. A process for redeeming cash-out codes in accordance with an embodiment of the invention is illustrated in FIG. 6. The process 600 includes obtaining (610) cash-out code redemption data. Cash-out code redemption data can include, but is not limited to, a cash-out code, information regarding the location where the cash-out code was redeemed, a timestamp describing the time the cash-out code was redeemed, the consumer account associated with the redemption of the cash-out code, a target account, or any other piece of redemption data as appropriate to the requirements of specific applications of embodiments of the invention. In many embodiments, a target account is identified (612). In numerous embodiments, the target account is a consumer account. A target account can be identified from cash-out code redemption data. A cash-out code can be utilized to obtain data from a generated code database in order to retrieve associated metadata, including, but not limited to, target account data, security data, and/or any other data as appropriate to the requirements of specific applications of embodiments of the invention. The retrieved metadata can be compared with the cash-out code redemption data to identify the target account. In a variety of embodiments, cash-out codes are keys in the generated code database.

Cash-out code redemption data can be verified (614). Fund transfer processes can verify cash-out code redemption data in a variety of ways. In many embodiments, verification data is obtained. Verification data can include a set of verification factors. Verification factors can include a variety of factors such as, but not limited to, the amount of funds able to be provided, the amount of funds able to be received by the target account, if transfers are allowed to the target account, and/or any other factor as appropriate to the requirements of specific applications of embodiments of the invention. In a plurality of embodiments, a verification factor is whether the identified target account is the same target account specified in the cash-out request data used to generate the cash-out code. A set of scores can be generated based on the factors described by the verification data. Techniques for utilizing the generated scores to verify transactions and/or determine fraud are described in more detail below.

Funds can be provided (616). In a variety of embodiments, funds are provided to the target account. In a plurality of embodiments, the provision of funds is a cash disbursement at a retailer system. In many embodiments, notification data are transmitted (618) to a client device associated with the cash-out request data that was used in generating the cash-out code described by the cash-out code redemption data.

Specific processes for redeeming cash-out codes are described above; however, any number of processes, including those that use alternative factors for verifying the cash-out code redemption data, can be utilized as appropriate to the requirements of specific applications in accordance with embodiments of the invention.

Generating and Identifying Consumer Accounts

Fund transfer processes can include identifying and generating consumer accounts. In many embodiments, fund transfer processes include obtaining various profile data describing a consumer. The consumer profile data can include a consumer account identification number, demographic information, location data, and/or a variety of other data regarding the consumer. The consumer profile data identifying the consumer can be compared against existing consumer account data to identify a specific consumer account associated with the obtained profile data. In the event that an existing consumer account does not exist, fund transfer processes can include generating a consumer account based on the obtained demographic information. In numerous embodiments, creating a consumer account includes generating a unique consumer account identification number. Consumer account identification numbers can be an alphanumeric string or any other identification data as appropriate to the requirements of specific applications of embodiments of the invention. The generation of consumer accounts can be an automatic process that occurs when data not associated with an existing consumer account is obtained.

Figure 7:
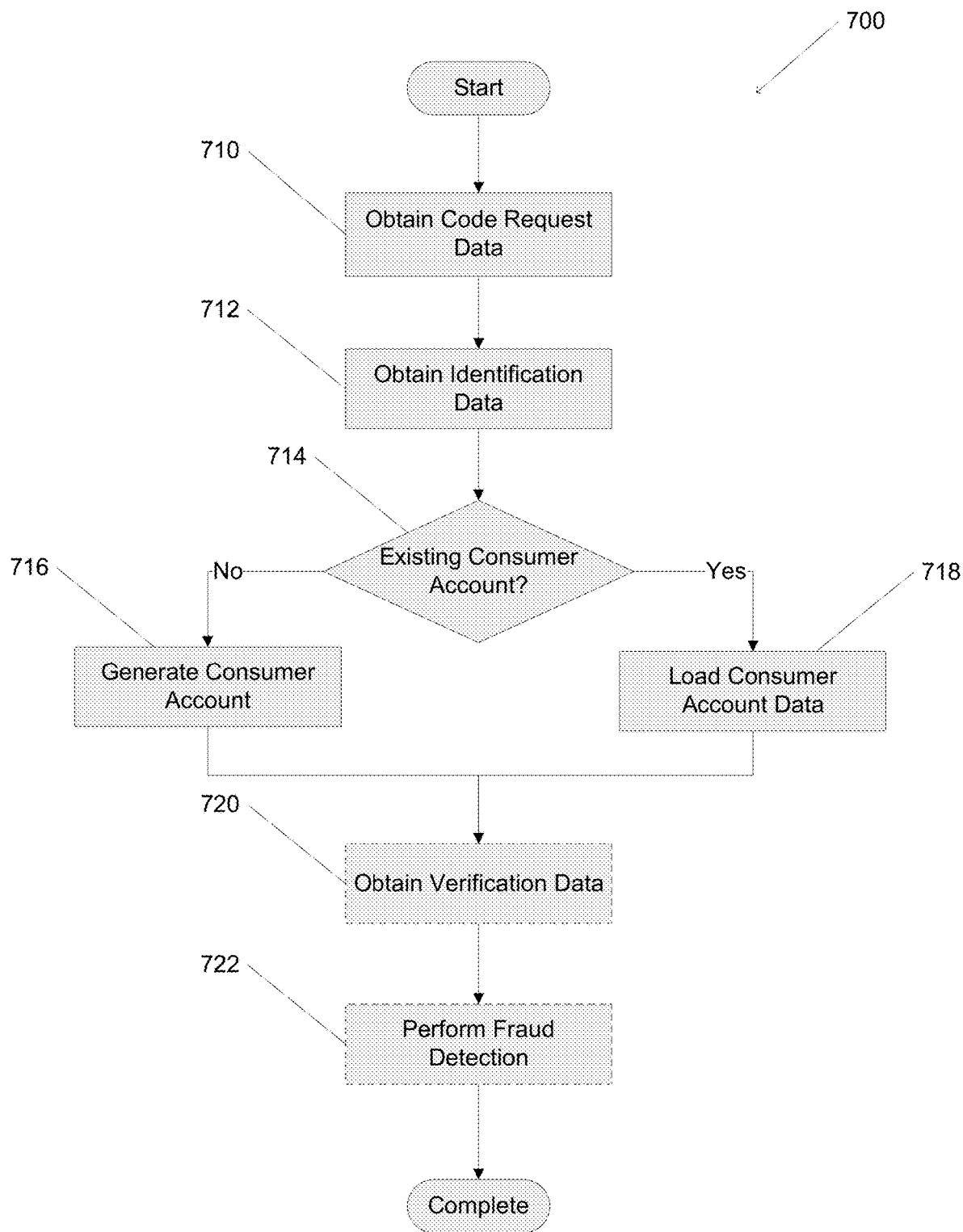
FIG. 7 is a flow chart illustrating a process for generating and identifying consumer accounts in accordance with an embodiment of the invention.

A process for generating and identifying consumer accounts in accordance with an embodiment of the invention is illustrated in FIG. 7. The process 700 includes obtaining (710) code request data, such as cash-in request data or cash-out request data. Identification data can be obtained (712). In many embodiments, identification data can be obtained from cash-in request data and/or cash-out request data. Identification can describe part or all of the data described by account data. Identification data can describe a fund source, a target account, a recipient, or any other party to a transfer. If a consumer account matching the identification data exists (714), the consumer account data can be loaded (718). A consumer account can match identification data if a consumer account identification number can be identified based on a comparison of identification data and the demographic information associated with the consumer account identification number. If a consumer account describing the identification does not exist (714), a consumer account can be generated (718). The generated consumer account can be generated based on the corresponding aspects of the identification data. The generated consumer account can include a unique consumer account identification number.

In numerous embodiments, verification data can be obtained (720). In a number of embodiments, verification data includes a set of fraud detection factors. The set of fraud detection factors can include a variety of fraud detection factors such as, but not limited to, the number of transfers associated with the generated/loaded consumer account, the time since the last transfer associated with the generated/loaded consumer account, the amount of funds transferred to and/or from the generated/loaded consumer account, the consumer accounts that have transferred funds to the generated/loaded consumer account, the consumer accounts that have received funds from the generated/loaded consumer account, and/or any other factor as appropriate to the requirements of specific applications of embodiments of the invention.

In a variety of embodiments, fraud detection can be performed (722). Fraud detection can include generating a set of scores based on the factors described by the verification data. In a number of embodiments, if the scores in the set of scores are above a score threshold, there is no indication of fraud. In numerous embodiments, there is a separate score threshold for each score in the set of scores. In a variety of embodiments, all of the scores in the set of scores must be above their score threshold for there to be no indication of fraud. In several embodiments, not all of the scores in the set of scores must be above their score threshold for there to be no indication of fraud. In a variety of embodiments, a fraud rating can be calculated based on the set of scores. Based on the fraud rating, a particular level of scrutiny can be applied to the request. For example, the request can be denied, specific limits can be replaced on the request, additional information can be requested prior to allowing the request to be processed, or any other level of scrutiny as appropriate to the requirements of specific embodiments of the invention. In a number of embodiments, specific limits are a limit on the amount of funds that can be transferred. In a plurality of embodiments, specific limits are a limit on which consumer account can be associated with the redemption of the code generated from the request. Systems and methods for determining fraud and/or providing authorization data that can be utilized in accordance with embodiments of the invention are described in U.S. patent application Ser. No. 14/699,753, titled "Systems and Methods for Loan Underwriting for Prepaid Accounts" and filed Apr. 29, 2015, the disclosure of which is hereby incorporated by reference in its entirety.

In many embodiments, fraud detection can occur when cash-in request data or cash-out code request data is obtained. In several embodiments, fraud detection can occur when cash-in code redemption data or cash-out code redemption data is obtained. Fund transfer processes can include fraud detection at any point as appropriate to the requirements of specific embodiments of the invention.

Specific processes for identifying and generating consumer accounts in accordance with embodiments of the invention are described above; however, it should be noted that any of a variety of processes not specifically described above, including those utilizing different or additional fraud detection factors can be utilized as appropriate to the requirements of specific applications of embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for conducting secure peer-to-peer transfers, comprising:
   obtaining, from a client device, cash-in request data, wherein:
   the cash-in request data comprises consumer account data and fund data,
   the consumer account data identifies a consumer account associated with the client device, and
   the fund data describes funds to be provided in response to redeeming a cash-in request;
   verifying the cash-in request data, wherein:
   verifying the cash-in request data comprises obtaining verification data, and
   the verification data comprises a set of verification factors directed to fraud detection, wherein the set of verification factors comprises a threshold value representing an amount of funds approved for transfers without additional verification;
   generating a cash-in code based on the cash-in request data, wherein the cash-in code is associated with metadata describing the consumer account and the fund data;
   providing the cash-in code to the client device;
   obtaining cash-in code redemption data, wherein the cash-in code redemption data identifies the provided cash-in code; and transmitting a request to deposit the funds described by the fund data into an internal funding account using the cash-in code redemption data.

2. The method of claim 1, further comprising:
obtaining cash-out request data, wherein:
the cash-out request data comprises metadata identifying a target consumer account, and
a verification factor of the set of verification factors affirms that the consumer account is identical to the target consumer account; and
transmitting the funds to the target consumer account.

3. The method of claim 1, wherein verifying the cash-in request data further comprises:
generating a set of verifying scores based on the set of verification factors; and
verifying the cash-in request data based on the set of verifying scores.

4. The method of claim 3, further comprising performing fraud detection by:
obtaining additional verification data comprising a set of fraud detection factors;
generating a fraud score based on the set of fraud detection factors; and
determining if the cash-in code is fraudulent by comparing the fraud score to a threshold score.

5. The method of claim 1, further comprising identifying the consumer account by:
querying a generated code database based on the cash-in code;
retrieving the metadata associated with the cash-in code from a generated code database; and
comparing the retrieved metadata with the cash-in code redemption data.

6. The method of claim 1, further comprising transmitting notification data to the client device, wherein the notification data can be utilized to display details regarding the cash-in request data using the client device.

7. The method of claim 1, wherein the cash-in code is a Quick Response (QR) code.

8. The method of claim 1, further comprising displaying the cash-in code using the client device.

9. The method of claim 8, wherein:
the displayed cash-in code is provided to a point of sale terminal using the client device; and
the cash-in code causes the point of sale terminal to obtain the funds identified in the cash-in code in response to providing of the cash-in code.

10. The method of claim 9, further comprising: when the cash-in code is provided to the point of sale terminal within a time period in which the cash-in code is valid, obtaining the funds using the point of sale terminal, wherein the cash-in code further comprises metadata identifying when the cash-in code is displayed and the time period in which the cash-in code is valid.

11. A fund transfer server system for implementing secure peer-to-peer transactions, comprising:
a processor; and
a memory connected to the processor and storing a fund transfer application, wherein the fund transfer application directs the processor to:
obtain, from a client device, cash-in request data, wherein:
the cash-in request data comprises consumer account data and fund data,
the consumer account data identifies a consumer account associated with the client device, and
the fund data describes funds to be provided in response to redeeming a cash-in request;
verify the cash-in request data, wherein:
verifying the cash-in request data comprises obtaining verification data, and
the verification data comprises a set of verification factors directed to fraud detection, wherein the set of verification factors comprises a threshold value representing an amount of funds approved for transfers without additional verification;
generate a cash-in code based on the cash-in request data, wherein the cash-in code is associated with metadata describing the consumer account and the fund data;
provide the cash-in code to the client device;
obtain cash-in code redemption data using the fund transfer server system, wherein the cash-in code redemption data identifies the provided cash-in code; and
transmit a request to deposit the funds described by the fund data into an internal funding account using the cash-in code redemption data.

12. The fund transfer server system of claim 11, wherein the fund transfer application further directs the processor to:
obtain cash-out request data, wherein:
the cash-out request data comprises metadata identifying a target consumer account, and
a verification factor of the set of verification factors affirms that the consumer account is identical to the target consumer account; and
transmit the funds to the target consumer account.

13. The fund transfer server system of claim 11, wherein the fund transfer application further directs the processor to verify the cash-in request data by:
generating a set of scores based on the set of verification factors; and
verifying the cash-in request data based on the set of scores.

14. The fund transfer server system of claim 13, wherein the fund transfer application further directs the processor to perform fraud detection by:
obtaining additional verification data comprising a set of fraud detection factors;
generating a fraud score based on the set of fraud detection factors; and
determining if the cash-in code is fraudulent by comparing the fraud score to a threshold score.

15. The fund transfer server system of claim 11, wherein the fund transfer application further directs the processor to identify the consumer account by:
querying a generated code database based on the cash-in code;
retrieving metadata associated with the cash-in code from a generated code database; and
comparing the retrieved metadata with the cash-in code redemption data.

16. The fund transfer server system of claim 11, wherein the fund transfer application further directs the processor to transmit notification data to the client device and the notification data can be utilized to display details regarding the cash-in request data using the client device.

17. The fund transfer server system of claim 11, wherein the cash-in code is a Quick Response (QR) code.

18. The fund transfer server system of claim 11, wherein the fund transfer application further directs the processor to display the cash-in code using the client device.

19. The fund transfer server system of claim 18, wherein:
the displayed cash-in code is provided to a point of sale terminal using the client device; and
the cash-in code causes the point of sale terminal to obtain the funds identified in the cash-in code in response to providing the cash-in code.

20. The fund transfer server system of claim 19, wherein:
the cash-in code further comprises metadata identifying when the cash-in code is displayed and a time period in which the cash-in code is valid; and
the fund transfer application further directs the processor to obtain the funds using the point of sale terminal when the cash-in code is provided to the point of sale terminal within the time period.

* * * * *